(12) United States Patent
Scott et al.

(10) Patent No.: US 9,487,152 B2
(45) Date of Patent: Nov. 8, 2016

(54) STOWABLE UTILITY RACK

(71) Applicants: Michael Gregory Scott, Ridge Spring, SC (US); David Cianni, Aiken, SC (US)

(72) Inventors: Michael Gregory Scott, Ridge Spring, SC (US); David Cianni, Aiken, SC (US)

( * ) Notice: Subject to any disclaimer, the term of this patent is extended or adjusted under 35 U.S.C. 154(b) by 486 days.

(21) Appl. No.: 13/894,113

(22) Filed: May 14, 2013

(65) Prior Publication Data

US 2014/0239025 A1      Aug. 28, 2014

Related U.S. Application Data

(60) Provisional application No. 61/768,978, filed on Feb. 25, 2013.

(51) Int. Cl.
| | |
|---|---|
| B60R 9/00 | (2006.01) |
| B60R 11/00 | (2006.01) |
| B60R 9/045 | (2006.01) |
| B60R 9/08 | (2006.01) |
| B60P 3/40 | (2006.01) |
| B60R 9/06 | (2006.01) |

(52) U.S. Cl.
CPC .............. B60R 9/045 (2013.01); B60P 3/40 (2013.01); B60R 9/00 (2013.01); B60R 9/08 (2013.01); *B60R 9/06* (2013.01); *B60R 2011/0082* (2013.01)

(58) Field of Classification Search
CPC ........ B60R 9/00; B60P 3/40; B62D 33/0207
USPC ...... 224/403, 497, 405; 296/3, 26.05, 26.06, 296/26.09, 26.1, 26.11; 211/195, 201
See application file for complete search history.

(56) References Cited

U.S. PATENT DOCUMENTS

| | | | | |
|---|---|---|---|---|
| 4,531,773 A * | 7/1985 | Smith | ........................ | 296/26.11 |
| 4,751,981 A * | 6/1988 | Mitchell | ................... | B60R 9/00 182/127 |
| 5,255,951 A * | 10/1993 | Moore, III | ................ | B60R 9/02 224/405 |
| 5,431,472 A * | 7/1995 | Coffland | ................... | B60R 9/00 224/405 |
| 5,662,254 A * | 9/1997 | Lemajeur | .............. | B60R 9/0485 224/405 |
| 6,152,675 A * | 11/2000 | Compton | ............. | B60P 1/5495 212/299 |
| 6,499,610 B2 * | 12/2002 | Spitsbergen | ............ | B66C 23/44 212/179 |
| 6,517,134 B2 * | 2/2003 | Armstrong | ................ | B60P 3/40 224/405 |
| 6,644,525 B1 * | 11/2003 | Allen | ........................ | B60R 9/06 224/282 |
| 6,644,704 B1 * | 11/2003 | Nyberg | ............................ | 296/3 |
| 7,104,429 B1 * | 9/2006 | Flores | ....................... | B60R 9/00 211/207 |
| 7,296,836 B1 * | 11/2007 | Sabo | ......................... | B60R 9/00 296/3 |
| 7,641,251 B1 * | 1/2010 | Stepanians | ................ | B60P 3/40 224/405 |
| 7,766,202 B2 * | 8/2010 | Depot | ....................... | B60R 9/06 224/504 |
| 8,240,529 B1 * | 8/2012 | Bell, III | ........................ | 224/497 |
| 2008/0079277 A1 * | 4/2008 | Wethington | .............. | B60P 3/40 296/3 |
| 2009/0255966 A1 * | 10/2009 | Prapavat | ....................... | 224/403 |

* cited by examiner

*Primary Examiner* — Justin Larson
*Assistant Examiner* — Lester L Vanterpool
(74) *Attorney, Agent, or Firm* — Dunlap Bennett & Ludwig PLLC

(57) ABSTRACT

A utility rack assembly including a first rack and a second rack that may be converted from an extended position to a stowed position. Each rack may include a base attachable to the bed of a pickup truck. The racks may further include a bottom member attached to the base and a top member pivotally connected to the bottom member. A main rack holder may also be pivotally connected to the top member. In the extended position, the base, bottom member, top member, and main rack holder form a rack to support equipment. In stowed position, the top member may pivot relative to the bottom member and the main rack holder may pivot relative to the top member.

12 Claims, 4 Drawing Sheets

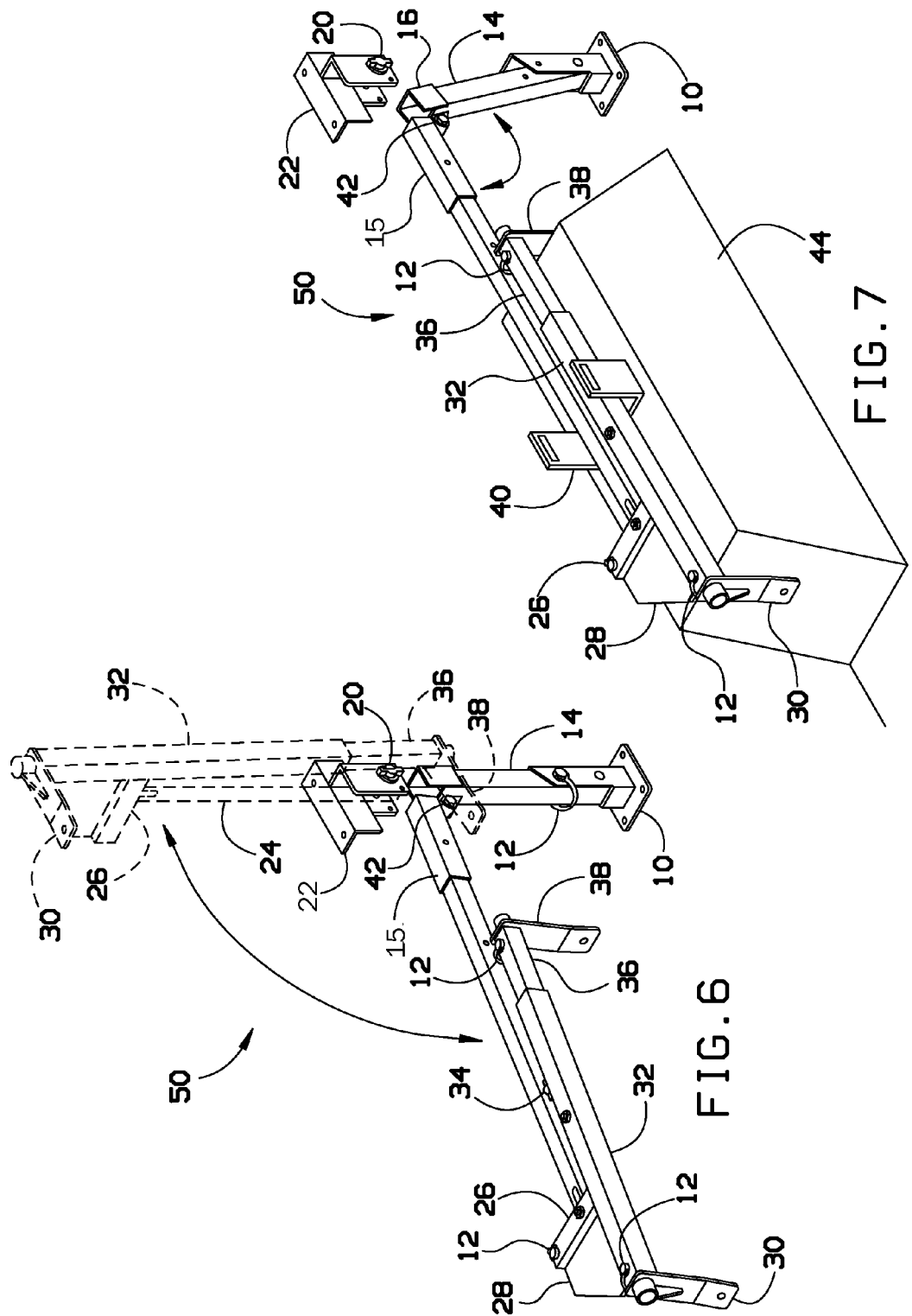

STOWABLE UTILITY RACK

BACKGROUND OF THE INVENTION

The present invention relates to a utility rack for a pickup truck and, more particularly, to a utility rack that may be folded and stowed when not in use.

Utility trucks are useful for their bed storage capacity. A utility rack may be used to carry equipment such as ladders, pipes, and tools. However, adding a utility rack may take up valuable space from the bed of the pickup truck. Typical racks for truck beds may include bulky equipment that may be in the way and unpleasant for the users daily functions. Further, the current racks may also require multiple components that may be misplaced when disassembled.

Additionally, a pick-up vehicle that is for multi-purpose use may often become dirty and may need to go through a car wash. The current racks makes going to the car wash very difficult. The current utility racks may further hinder the attachment of a shell cover or camper unit to the pickup truck. Therefore, the removal and remounting of the rack is required which takes a considerable amount of time. Existing racks on the market cannot be stowed and are not readily accessible within a minimal amount of time.

As can be seen, there is a need for a stowable utility rack for a pickup truck bed.

SUMMARY OF THE INVENTION

In one aspect of the present invention, a utility rack assembly comprises: a first rack and a second rack, wherein each of the first rack and the second rack comprises: a base configured to attach to a truck bed; a bottom member having a first end and a second end, wherein the first end is attached to the base; a top member having a first end and a second end, wherein the first end of the top member is pivotally connected to the second end of the bottom member; a main rack holder substantially perpendicular to the top member, wherein the main rack holder is pivotally connected to the second end of the top member, wherein each pivotal connection comprises an extended locked position and a pivoted stowed position.

These and other features, aspects and advantages of the present invention will become better understood with reference to the following drawings, description and claims.

BRIEF DESCRIPTION OF THE DRAWINGS

FIG. 6 is a perspective view of the present invention shown with the three-tier main scope of FIG. 3 folded down;

FIG. 7 is a perspective view of the present invention shown with the utility rack assembly of FIG. 3 resting on a rear wheel well.

DETAILED DESCRIPTION OF THE INVENTION

Figure 1:
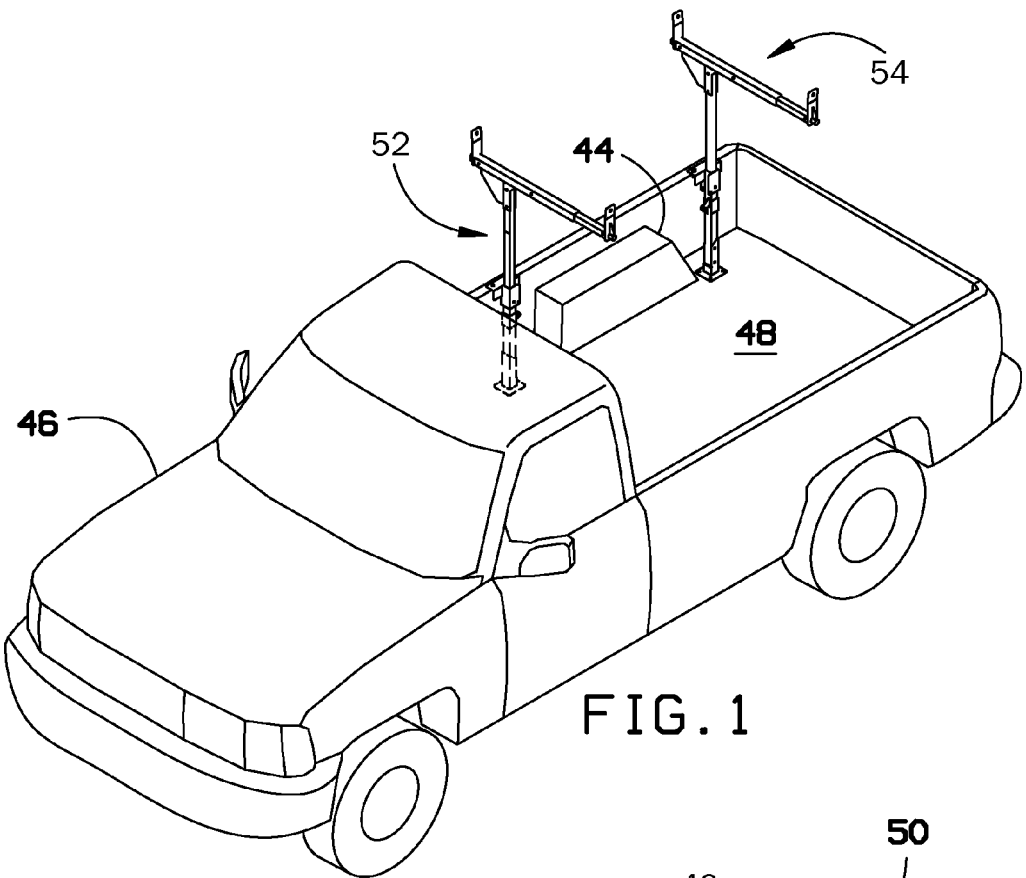
FIG. 1 is a perspective view of the present invention shown in use in an extended position.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a utility rack assembly including a first rack and a second rack that may be converted from an extended position to a stowed position. Each rack may include a base attachable to the bed of a pickup truck. The racks may further include a bottom member attached to the base and a top member pivotally connected to the bottom member. A main rack holder may also be pivotally connected to the top member. In the extended position, the base, bottom member, top member, and main rack holder form a rack to support equipment. In stowed position, the top member may pivot relative to the bottom member and the main rack holder may pivot relative to the top member.

The present invention may include a universal pickup truck utility rack that may be in a stowed position when not in use and therefore does not hinder space. The present invention may provide take up little space on a pick-up truck. Further, the present invention may include universal rack since the rack may fit in a short bed or a long bed, allowing for multiple sized pick-up vehicle installations. Further, the present invention may include multiple layers of material at its key points which allow for extra strength. Once its main holding brackets are installed, this rack system may be in an upright working position in less than a minute. Likewise, the rack of the present invention may be hidden away in the same amount of time.

The mechanical design applied to the artfully provides the sound structure and functionality through unique slots and position holes at key places on the tubing members of the device. The assembly remains as a single unit throughout its use with its quick release pins in proper positions. Once the user no longer needs the rack in place the rack may be hidden and the vehicle may regain its normal functionality. A shell cover unit or camper may be put in place in the retracted position.

As mentioned above, the present invention may utilize almost all of the bed space for its intended purpose such as for the hauling of standard sized materials. Further, the present invention is universal and may fit in any small or large truck. The present invention may be transformed into a working position and just as easily put back into a hidden position. This allows for multi-purpose usage of the vehicle and easier accessibility to pass through car washes.

The present invention may include a fold-able rack that is easy to install. The present invention may include thick support members through the telescoping of its structural components. The present invention may further include three tiers of metal-layering. The systems components may be kept as a folding unit with minimal pin attachments.

Referring to FIGS. 1 through 8, the present invention may include a utility rack assembly 50. The utility rack assembly 50 may include a first rack 52 and a second rack 54 which may mirror each other. The utility rack assembly 50 may be mounted to a truck bed 48 of a truck 46. The utility rack assembly 50 may be in an extended locked position, in which the utility rack assembly 50 may support equipment. The utility rack assembly 50 of the present invention may further be in a stowed position. In certain embodiments, the utility rack assembly 50 may be folded into the stowed position and may rest on a hidden rack holder 40 that is mounted to a rear wheel well 44 of the truck 46.

The utility rack assembly 50 of the present invention may include a base 10. The base 10 may be mounted to the truck bed 48. The utility rack assembly 50 may further include a bottom member having a first end and a second end. The first end of the bottom member may be attached to the base. The utility rack assembly 50 may further include a top member having a first end and a second end. The first end of the top member may be pivotally connected to the second end of the bottom member. The present invention may further include a main rack holder 32 that may be pivotally connected to the second end of the top member. Each pivotal connection of the present invention may include an extended locked position and a pivoted stowed position. The pivoted stowed position may include the main rack holder 32 pivoted to be substantially parallel relative to the top member, and the top member pivoted to be substantially perpendicular relative to the bottom member.

In certain embodiments, the bottom member of the present invention may include a lower two-tier flex scope 14 having a top end and a bottom end. The bottom end of the lower two tier-flex scope 14 may be hinged to the base 10. The lower two-tier flex scope 14 may be set in the base 10 with a welded through-bolt. The base 10 may include a slotted section which may allow pivoting of the lower two-tier flex scope 14 relative to the base 10. A quick connect pin 12 may prevent the lower two tier flex scope 14 from pivoting. The bottom member may further include a guide coupler bracket 16 which may be welded to the top end of the lower two-tier flex scope 14. The coupler bracket 16 may provide a guide for the vertical alignment for the top member, which may include an upper two-tier flex scope 15 as well as a three-tier main scope 24.

As mentioned above, the top member of the present invention may include the upper two-tier flex scope 15. The upper two-tier flex scope 15 may include a top end and a bottom end. The bottom end may rest within the coupler bracket 16 and may be connected to the lower two-tier flex scope 14 at a two-tier hinge 18 with a two-tier hinge bolt 42. Therefore, the upper two-tier flex scope 15 may pivot relative to the lower two-tier flex scope 14. In certain embodiments, a top main frame bracket 22 may be secured to the truck bed 48. The upper two-tier flex scope 15 may rest within the top main frame bracket 22 in the extended position.

The top member may further include a three-tier main scope 24. The three-tier main scope 24 may include a top end and a bottom end. The bottom end of the three-tier scope 24 may be attached to the top end of the upper two-tier flex scope. In certain embodiments, the three-tier main scope 24 may slide into the top of the upper two-tier flex scope 15 and a top main bracket tightening bolt 20 may further secure the upper two-tier flex scope 15 and the three-tier main scope 24 to the top main frame bracket 22 in the extended position. Another quick connect pin 12 may prevent the upper two-tier flex scope 14 from pivoting.

A main rack holder 32 may be pivotally connected to the top end of the three-tier main scope 24 by a quick release hinge coupler 26. In certain embodiments, the main rack holder 32 may be hollow and may include a first end and a second end. The quick release hinge coupler 26 may include a housing and the three-tier main scope 24 may rest within the housing and may be pivotally connected to the housing. This may allow for the main rack holder 32 to be rotated up to around 90 degrees downward into the stowed position. A quick connect pin 12 may prevent the main rack holder 32 from pivoting relative to the three-tier main scope 24. In certain embodiments, a reflector plate holder 28 may be welded to the quick release hinge coupler and the main rack holder 32.

In certain embodiments, the present invention may include a telescoping rack extension 36 having a first end and a second end. The first end of the telescoping rack extension 36 may slide within the first end of the main rack holder 32. The telescoping rack extension 36 may be attached to the main rack holder 32 via a welded bolt and a slotted side which allows for the telescoping rack extension 36 to extend from the main rack holder 32. In certain embodiments, a main rack tightener 34 may be used to tighten the telescoping rack extension 36 into place at a desired position.

In certain embodiments, a pivotal end rack holder 30 may be rotatably attached into the second end of the main rack holder 32. A pivotal rack holder 38 may also be rotatably attached to the second end of the telescoping rack extension 36. Both of the pivotal end rack holder 30, 38 may be in the extended form and also may be rotated to the stowed form. The pivotal end rack holders 30, 38 may be secured in the extended form via quick connect pins 12.

The following may include a method of making the present invention. The rack of the present invention may include metal tubing to be machined in a fabrication shop. The individual pieces may be cut to size and accordingly slotted to match the mechanical characteristics needed for the multiple scenarios of pick-up truck beds. The items are placed in position allowing for universal usage. For installation purposes, the proper hardware may include washers nuts and bolts properly sized for the attachment of the present invention to the pick-up's bed 48. Through-holes may be added by the user. These holes may be added while the rack is in an extended position. The through holes may add more stability for carrying heavier loads.

Figure 2:
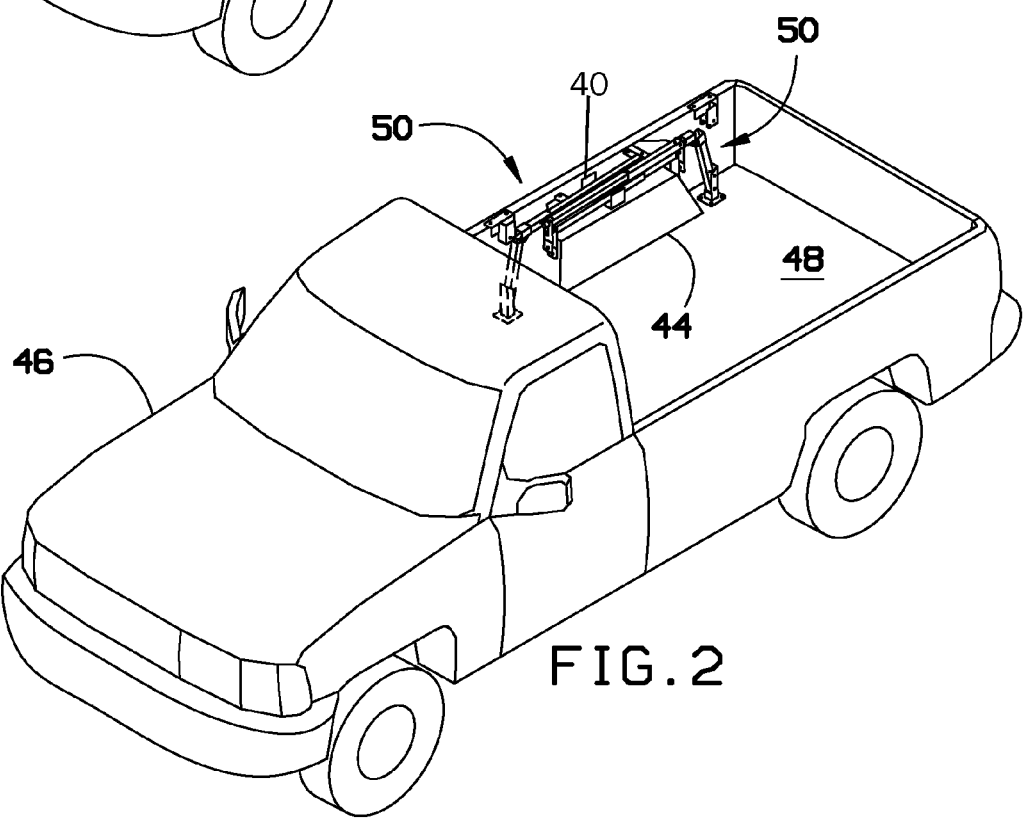
FIG. 2 is a perspective view of the present invention shown in use in a stowed position.
Figure 5:
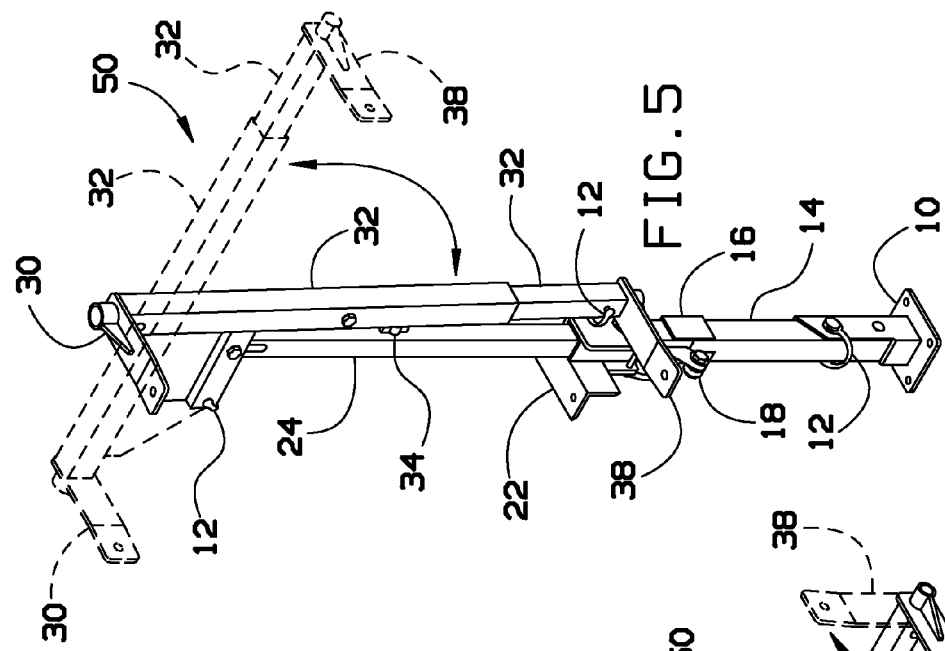
FIG. 5 is a perspective view of the present invention shown with the extension rack of FIG. 3 folded down.
Figure 4:
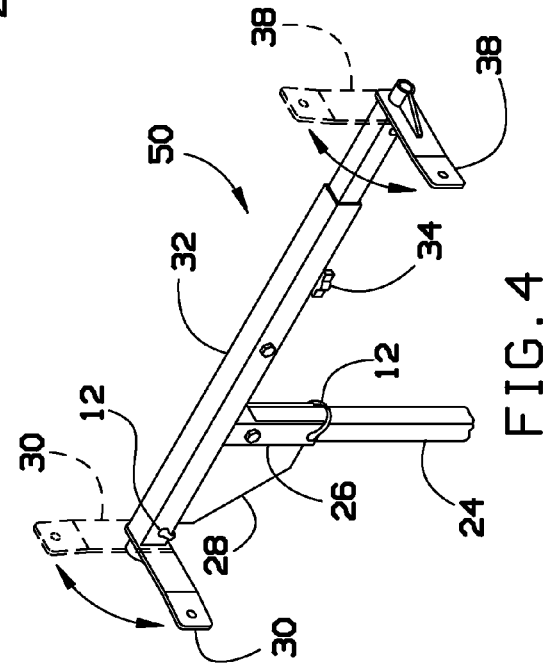
FIG. 4 is a perspective view of the present invention shown with the pivotal rack holders of FIG. 3 rotated.
Figure 3:
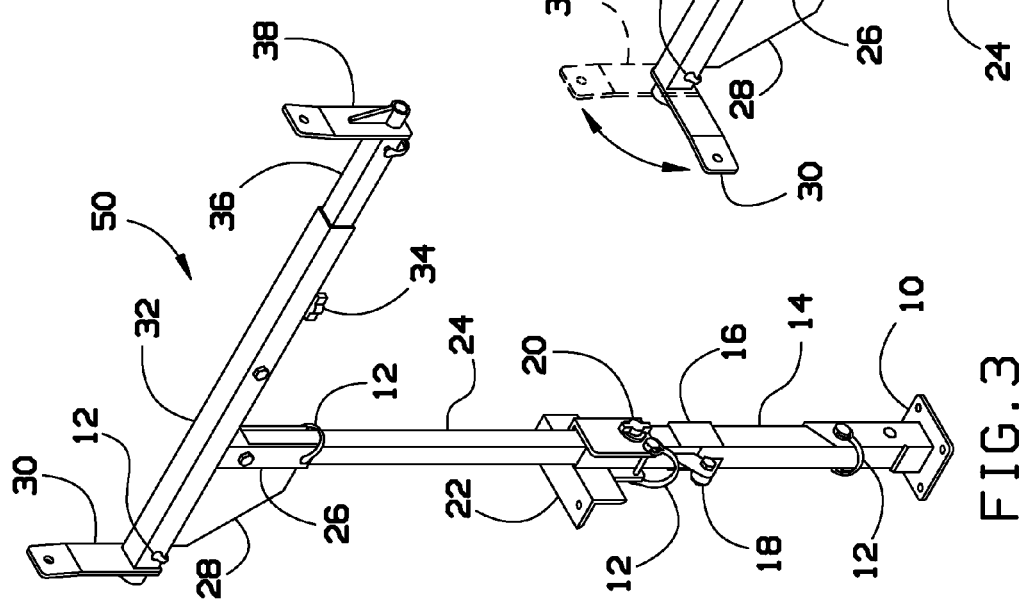
FIG. 3 is a perspective view of the present invention shown in the extended position.
Figure 8:
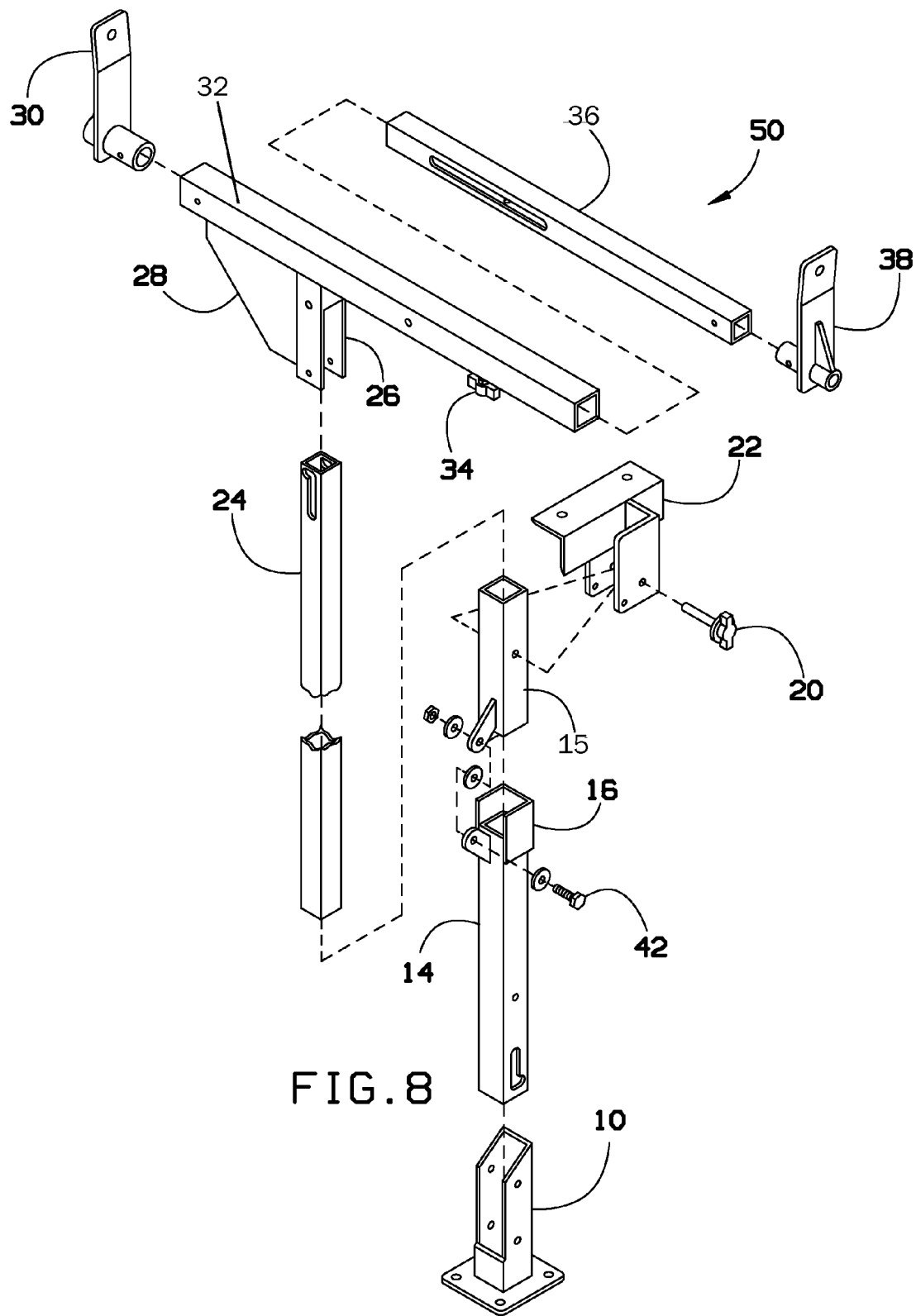
FIG. 8 is an exploded perspective view of the present invention shown with the quick connect pins of FIG. 3 removed for clarity.

The following may include a method of using the present invention. FIGS. 1 through 7 illustrate the rack assembly 50 transforming from the extended Position to the stowed Position. FIGS. 1 and 3 illustrate the rack assembly 50 in an Upright Position. As illustrated in FIG. 4, the quick connect pin 12 may be released from the main rack holder 32 and the telescoping rack extension 36 to allow the pivotal end rack holders 30, 38 to pivot around 90 degrees. As illustrated in FIG. 5, the quick connect pin 12 on the quick release hinge coupler 26 may be removed so that the main rack holder 32 may pivot relative to the three-tier main scope 24. In the pivoted form, the main rack holder 32 may be substantially parallel to the three-tier main scope 24. As illustrated in FIG. 6, the quick connect pin 12 attached to the top main frame bracket 22 may be removed, and the main rack holder may be lifted and may pivot around 90 degrees relative to the lower two-tier flex scope and may be placed vertically. As illustrated in FIG. 7, the quick connect pin 12 at the base 10 may be removed and the lower two-tier flex scope may pivot relative to the base 10. FIGS. 2 and 7 provide an illustration of the final stowed position. In the stowed position, the rack assembly 50 may rest hidden and substantially parallel to the pick-up's bed 48 resting over the wheel well 44.

The utility rack assembly may take less than a minute for a user to erect the racks and secure ladders, pipe, angle iron, wood, small canoes and other long pieces of material to the assembly. At the same time, a user may be able to load his truck bed with flat stock materials such as standard sized 4' paneling, sheet rock and plywood. Upon unloading, the user may be able to stow the rack in less than a minute and drive through a car-wash and be able to go out with the same vehicle on a family outing or the like.

It should be understood, of course, that the foregoing relates to exemplary embodiments of the invention and that modifications may be made without departing from the spirit and scope of the invention as set forth in the following claims.

What is claimed is:

1. A utility rack assembly comprising:
    a first rack and a second rack, wherein each of the first rack and the second rack comprises:
        a base configured to attach to a truck bed;
        a bottom member having a first end and a second end, wherein the first end is attached to the base;
        a top member having a first end and a second end, wherein the first end of the top member is pivotally connected to the second end of the bottom member;
        a main rack holder substantially perpendicular to the top member, wherein the main rack holder is pivotally connected to the second end of the top member, wherein
    the first rack and the second rack comprise an extended locked position and a pivoted stowed position, the pivoted stowed position comprising the main rack holders pivoted to be substantially parallel relative to the top members, and the to members pivoted towards one another so that the top members are substantially perpendicular relative to the bottom members.

2. The utility rack assembly of claim 1, wherein the bottom member comprises:
    a lower two-tier flex scope comprising a top end and a bottom end, wherein the bottom end is pivotally connected to the base; and
    a guide coupler bracket attached to the top end of the lower two-tier flex scope, wherein the top member rests within the guide coupler bracket in the extended locked position.

3. The utility rack assembly of claim 2, wherein the top member comprises:
    an upper two-tier flex scope comprising a top end and a bottom end, wherein the bottom end of the upper two-tier flex scope is pivotally connected to the top end of the lower two-tier flex scope by a hinge and a hinge bolt; and
    a three-tier main scope having a top end and a bottom end, wherein the bottom end of the three-tier main scope is attached to the top end of the upper two-tier flex scope.

4. The utility rack assembly of claim 3, further comprising a top main frame bracket configured to be attached to the truck bed, wherein the upper two-tier flex scope is locked to the top main frame bracket in the extended locked position.

5. The utility rack assembly of claim 3, wherein the main rack holder is pivotally connected to the top end of the three-tier main scope by a quick release hinge coupler.

6. The utility rack assembly of claim 5, wherein the quick release hinge coupler further comprises a reflector plate holder.

7. The utility rack assembly of claim 5, wherein the main rack holder is hollow and comprises a first end and a second end.

8. The utility rack assembly of claim 7, further comprising a telescoping rack extension having a first end and a second end, wherein the first end of the telescoping rack extension fits within and is slidably attached to the first end of the main rack holder.

9. The utility rack assembly of claim 8, further comprising a main rack tightener operatively connected to the main rack holder and configured to secure the telescoping rack extension in a fixed position relative to the main rack holder.

10. The utility rack assembly of claim 8, further comprising a first pivotal end rack holder and a second pivotal end rack holder, wherein the first pivotal end rack holder is pivotally connected to the second end of the main rack holder and the second pivotal end rack holder is pivotally connected to the second end of the telescoping rack extension.

11. The utility rack of claim 10, wherein each pivotal connection comprises an extended locked position and a pivoted stowed position.

12. The utility rack of claim 11, wherein each pivotal connection comprises a quick connect pin to retain the pivotal connection in the extended locked position.

* * * * *